3,494,957
POLYOL ESTERS OF α-ARYLOXYALKANOIC
ACIDS
Michio Nakanishi, Nakatsu, Oita, Tsuneto Kuriyama, Chikujo-gun, Fukuoka, Takanori Oe, Nakatsu, Oita, and Toshihiro Kobayakawa, Chikujo-gun, Fukuoka, Japan, assignors to Yoshitomi Pharmaceutical Industries, Ltd., Osaka, Japan
No Drawing. Filed Jan. 5, 1966, Ser. No. 518,790
Claims priority, application Japan, Jan. 5, 1965, 40/390
Int. Cl. C07c 69/76; A61k 27/00
U.S. Cl. 260—473                                6 Claims

ABSTRACT OF THE DISCLOSURE

Compounds of the formula

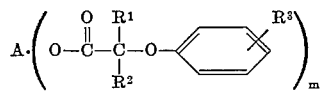

where $R^1$ is methyl, $R^2$ is methyl or ethyl, $R^3$ is H, Cl, methyl or methoxy, A is —$CH_2$—$C{\equiv}C$—$CH_2$—, —$CH_2CH$—$CH_2$—,

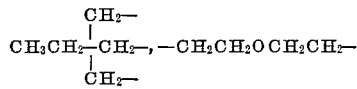

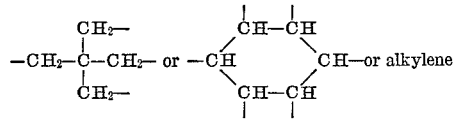

of 2 to 8 carbon atoms, $m$ is the valence of A, are useful in the prophylaxis or treatment of hyperlipemia, etc.

---

This invention relates to polyol esters of α-aryloxyalkanoic acids and analogs thereof.

Ethyl α-(p-chlorophenoxy)isobutyrate has proved useful in the treatment of hypercholesteremia (e.g. Journal of Atherosclerosis Research, vol. 3, pages 341–753, 1963). However the compound occurs as an oily liquid, and the safety margin is not very wide.

In the treatment of hypercholesteremia, the patients are usually required to take anti-hypercholesteremic agents or cholesterol lowering agents continuously over a long period of time, for example three to twelve months. Therefore such agents should be as effective as possible and as non-toxic as possible. Also it is desirable that such agents should be tasteless, odorless solids so that making of preparations containing the agents as well as taking of the agents by the patients may be easier.

The present invention provides polyol esters of α-aryloxyalkanoic acids and analogs thereof of the formula

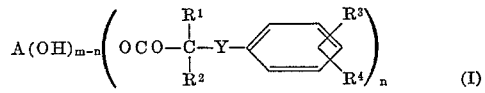

where $R^1$ is H or alkyl of 1 to 4 carbon atoms and $R^2$ is alkyl of 1 to 4 carbon atoms, or $R^1$ and $R^2$ together with the adjacent carbon atoms represent cycloalkylidene of 5 to 6 carbon atoms;
$R^3$ and $R^4$ are repsectively H, halogen, $NO_2$, alkyl of 1 to 4 carbon atoms, alkoxy of 1 to 4 carbon atoms or alkanoyl of 2 to 4 carbon atoms;
Y is O, S, $SO_2$ or NH;

A is alkylene of 2 to 8 carbon atoms, 2-butyne-1,4-diyl, alkanetriyl of 3 to 12 carbon atoms, alkanetetrayl of 4 to 6 carbon atoms, 1-(4-alkoxycarbonyl-5-alkyl-2-furyl)butane-1,2,3,4-tetrayl (alkoxy and alkyl respectively being of 1 to 2 carbon atoms), 1,2,3,4,5,6-cyclohexanehexayl, or bivalent or trivalent radical of the formula

where
$A^1$, $A^2$ and $A^3$ are respectively alkylenes of 2 to 4 carbon atoms,
$Y^1$ is O, S, $SO_2$ or 1,4-piperazinediyl, and
$R^5$ is alkyl of 1 to 4 carbon atoms, cyclohexyl or phenyl;
$m$ is valence of A; and
$n$ is a whole number of 1 to 6 but not greater than $m$.

These compounds are on the whole less toxic and more active as cholesterol lowering agents than ethyl α-(p-chlorophenoxy)isobutyrate. Some of them are tasteless, odorless crystalline powders.

The alkyl represented by $R^1$, $R^2$, $R^3$, $R^4$ or $R^5$ includes methyl, ethyl, propyl, isopropyl and butyl. The cycloalkylidene represented by $R^1$ and $R^2$ together with the adjacent carbon atom includes cyclopentylidene and cyclohexylidene. The halogen represented by $R^3$ or $R^4$ includes F, Cl, Br and I. The alkoxy represented by $R^3$ or $R^4$ is for example methoxy, ethoxy, propoxy or butoxy. Acetyl, propionyl and butyroyl are examples of the alkanoyl which may also be represented by $R^3$ or $R^4$. The alkylene represented by A may be either straight or branched, including ethylene, propylene, trimethylene, 2-methyltrimethylene, 2,2-dimethyltrimethylene, 2-methyl-2-propyltrimethylene, tetramethylene and hexamethylene. The alkanetriyl represented by A includes 1,2,3-propanetriyl and radicals of the formula

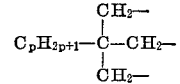

where $p$ is a whole number of 1 to 8. The alkanetetrayl represented by A includes 1,2,3,4-butanetetrayl and radical of the formula

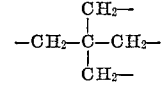

The alkylenes which $A^1$, $A^2$ and $A^3$ respectively represent include ethylene, propylene, trimethylene tetramethylene.

The compounds of the invention are prepared by reacting a compound of the formula

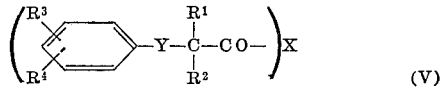

with a compound of the formula $$A(OH)_m \qquad \text{(VI)}$$

where symbols $R^1$, $R^2$, $R^3$, $R^4$, Y, A and $m$ are defined as above, $a$ is a whole number of 1 or 2, and X is OH, halogen or alkoxy of 1 to 4 carbon atoms when $a$ is 1, and —O— when $a$ is 2.

The reaction is carried out in the absence or presence of an inert solvent, e.g. benzene, toluene, xylene, chloroform, carbon tetrachloride, hexane, cyclohexane, acetone or ether.

The reaction may, if necessary, be carried out in the presence of a deacidifying agent such as an organic base (e.g. trialkylamine, N,N-dialkylaniline, pyridine or quinoline) or an alkali or alkaline earth carbonate or hydroxide.

The reaction may also be carried out in the presence of a catalyst such as hydrogen chloride, sulfuric acid, phosphoric acid, phosphorus oxychloride, aromatic sulfonic acid (e.g. benzenesulfonic acid or p-toluenesulfonic acid), alkali alkoxide (e.g. sodium methoxide or ethoxide), aluminum isopropoxide or boron trifluoride.

Modification may be made in the reaction of a compound (V) where $a$ is 1 and X is OH with a compound (VI) for example preliminarily reacting a compound (V) with an aliphatic or aromatic sulfonyl chloride in the presence of an organic base or an alkali or alkaline earth carbonate, then adding a compound (VI), or reacting a compound (V) with a compound (VI) in the presence of a sulfonyl chloride along with an organic base or an alkali or alkaline earth carbonate.

The reaction can be accelerated by heating for example at a temperature between 50° C. and reflux temperature. The reaction can, if desired, be carried out under reduced pressure.

For example, the compounds of the invention are advantageously prepared by reacting a compound (V) where $a$ is 1 and X is OH with a compound (VI) in benzene, toluene, xylene or chloroform under heating to remove the formed water azeotropically, preferably in the presence of sulfuric acid, phosphoric acid or p-toluenesulfonic acid; by reacting a compound (V) where $a$ is 1 and X is OH with a compound (VI) in the presence of methanesulfonyl chloride or p-toluenesulfonyl chloride along with pyridine, preferably under heating; by reacting a compound (V) where $a$ is 1 and X is halogen, preferably Cl, with a compound (VI) in the presence of triethylamine, pyridine or quinoline, preferably at 0–100° C.; by reacting a compound (V) where $a$ is 1 and X is alkoxy, preferably methoxy or ethoxy, with a compound (VI) in the presence of potassium carbonate, sodium carbonate or aluminum isopropoxide under heating at 100–250° C. to remove the formed alcohol, if desired under mildly reduced pressure; or by reacting a compound (V) where $a$ is 2 and X is O with a compound (VI), preferably under heating in benzene, hexane, ether or acetone, if desired in the presence of sulfuric acid, pyridine or boron trifluoride.

Upon completion of the reactions, the reaction mixtures are treated in a per se conventional way to yield the compounds (I).

The toxicity of the compounds of the invention is relatively low. Table 1 shows the $LD_{50}$ values in grams per kilogram of body weight when each compound was administered orally to male albino mice weighing 18–22 grams.

TABLE 1

| α-(p-Chlorophenoxy)isobutyric acid ester [1] of— | $LD_{50}$ |
|---|---|
| Ethanol | 0.98 |
| Ethyleneglycol | 1.5 |
| Propyleneglycol | 3.0 |
| 1,3-propanediol | 8.40 |
| 2-methyl-2-propyl-1,3-propanediol | >5.0 |
| 2-butyne-1,4-diol | >5.0 |
| Glycerol | >10.0 |
| 1,1,1-trimethylolpropane | >10.0 |
| Pentaerythritol | >10.0 |

[1] None of the esters in Tables 1 and 2 is a partial ester.

The cholesterol lowering activity of the compounds of the invention is strong, and often stronger than ethyl α-(p-chlorophenoxy)isobutyrate. Table 2 shows the results obtained in comparison of the cholesterol levels in serum of male Wistar strain rats weighing 150–200 grams before and after 30 days oral administration.

TABLE 2

| Compound | Daily Dosage, mg./kg. body weight | Reduction, percent |
|---|---|---|
| α-(p-chlorophenoxy(isobutyric acid ester of— | | |
| Ethanol | 75 | 7 |
|  | 150 | 17 |
| 1,3-propanediol | 75 | 21 |
|  | 150 | 39 |
| Ethyleneglycol | 300 | 28 |
| 2-methyl-2-propyl-1,3-propanediol | 300 | 23 |
| 1,3-propanediol bis[α-p-tolyloxy)isobutyrate] | 100 | 15 |
| 1,3-propanediol bis[α-(p-chlorophenoxy)propionate] | 75 | 22 |
| 1,3-propanediol bis[α-(p-chlorophenoxy)-α-methylbutyrate] | 300 | 1 |

Moreover, among the compounds of the invention there are many that can be obtained in the form of tasteless and odorless crystalline solids at room temperature. These crystalline compounds are more easily made into preparations such as tablets and powders, and combination of such compounds with other active ingredients such as androsterone is easy. The patients also favor taking of such tasteless and odorless preparations.

With respect to safety margin which is defined as the ratio of the $LD_{50}$ value to the effective dose, one of the preferred compounds 1,3-propanediol bis[α-(p-chlorophenoxy)isobutyrate], for example, has the safety margin of about 84, when the effective dose is 0.1 gram per kilogram of body weight, whereas with ethyl α-(p-chlorophenoxy)isobutyrate the value is about 9.8. This fact reveals that the former compound can be administered to human bodies much more safely than the latter.

Thus the compounds of the invention can be safely used for prophylaxis or treatment for hyperlipemia and arteriosclerosis due to hyperlipemia; for prophylaxis of thrombosis and embolic complications; for phophylaxis and treatment for circulatory disorders in diabetes mellitus (arteriosclerosis and coronary disease); for treatment for xanthoma, gout and so forth.

Typical presently preferred embodiments of the invention are as follows:

EXAMPLE 1

To a solution of 1.6 grams of ethyleneglycol in 50 milliliters of pyridine was added dropwise 15 grams of α-(p-chlorophenoxy)isobutyrol chloride at 10–15° C. over 30 minutes. The mixture was heated at 60–70° C. for 2 hours and poured into ice water. The separated oil was extracted with benzene. The extract was washed with dilute hydrochloric acid and water, and concentrated. The oily residue was distilled under reduced pressure to give 10.5 grams (90% yield) of ethyleneglycol bis[α-(p-chlorophenoxy)isobutyrate] boiling at 205–210° C./0.08 mm. Hg and melting at 25–30° C.

Similarly prepared were:

Propyleneglycol bis[α - (p - chlorophenoxy)isobutyrate] boiling at 190–195° C./0.05 mm. Hg and melting at 35–38° C. in 66% yield;

1,3-propanediol bis[α - (p - chlorophenoxy)isobutyrate] boiling at 220–230° C./0.15 mm. Hg and melting at 48–50° C. in 75% yield;

2 - methyl - 1,3 - propanediol bis[α - (p - chlorophenoxy)isobutyrate] boiling at 205° C./0.04 mm. Hg in 68% yield;

2-methyl-2-propyl-1,3-propanediol bis[α-(p-chlorophenoxy)isobutyrate] boiling at 200–210° C./0.03 mm. Hg and melting at 59–62.5° C. in 84% yield;

Ethyleneglycol bis[α - (o - chlorophenoxy)isobutyrate] boiling at 172–180° C./0.012 mm. Hg in 69% yield;

Ethyleneglycol bis[α-(m-tolyloxy)isobutyrate] boiling at 162–168° C./0.015 mm. Hg in 73% yield;

Ethyleneglycol bis[α-(p-methoxyphenoxy)isobutyrate] boiling at 195–200° C./0.01 mm. Hg in 61% yield;

Ethyleneglycol bis(α - phenoxyisobutyrate) boiling at 172–175° C./0.015 mm. Hg in 57% yield;

1,3-propanediol bis[α-(p-tolyloxy)isobutyrate] boiling at 185–190° C./0.04 mm. Hg in 89% yield;

1,3 propanediol bis[α - (p - methoxyphenoxy)isobutyrate] boiling at 210–220° C./0.015 mm. Hg in 58% yield; and 1,3 - propanediol bis[α - (p - chlorophenoxy) - α - methylbutyrate] boiling at 230–240° C./0.05 mm. Hg in 96% yield.

EXAMPLE 2

The procedure in Example 1 was followed with 4.6 grams of glycerol, 100 milliliters of pyridine and 35 grams of α-(p-chlorophenoxy)isobutyroyl chloride. The obtained oily product was dissolved in chloroform and purified by chromatography over activated alumina to give 24.5 grams (72% yield) of glycerol tris[α-(p-chlorophenoxy)isobutyrate] melting at 55–58° C.

Similarly prepared were:

Methyl 2 - {1,2,3,4 - tetrakis[α - (p - chlorophenoxy)-isobutyroyloxy]butyl} - 5 - methyl - 4 - furancarboxylate, the refractive index at 20° C. being 1.548, in 39% yield;

Methyl 2 - {1,2,3,4 - tetrakis[α - (p - tolyloxy)isobutyroyloxy]butyl} - 5 - methyl - 4 - furancarboxylate, the refractive index at 28° C. being 1.529, in 11% yield;

Methyl 2 - {1,2,3,4 - tetrakis[α - (m - tolyloxy)isobutyroyloxy]butyl} - 5 - methyl - 4 - furancarboxylate, the refractive index at 31° C. being 1.529, in 11% yield; and Methyl 2-{1,2,3,4-tetrakis[α-(p-methoxyphenoxy)-propionyloxy]butyl}-5-methyl-4-furancarboxylate, the refractive index at 30° C. being 1.536, in 13% yield.

[As to the starting material methyl 2-(1,2,3,4-tetrahydroxybutyl) - 5 - methyl - 4 - furancarboxylate, see e.g. Chemical Abstracts, vol. 41, col. 6558 c–g (1947).]

EXAMPLE 3

2-butyne-1,4-diol (5.5 grams), 100 milliliters of pyridine and 30 grams of α-(p-chlorophenoxy)isobutyroyl chloride were allowed to react as in Example 1. When the reaction mixture was poured into ice water, crystals precipitated, which were isolated by filtration, washed with water and recrystallized from a mixture of n-hexane and benzene to give 23 grams (76% yield) of 2-butyne-1,4-diol bis[α-(p-chlorophenoxy)isobutyrate] melting at 88–90° C.

Similarly prepared were:

1,1,1 - trimethylolpropane tris[α - (p - chlorophenoxy)-isobutyrate] melting at 86–87° C. (recrystallized from methanol) in 72% yield; and Pentaerythritol tetrakis[α - (p - chlorophenoxy)isobutyrate] melting at 112° C. (recrystallized from ethanol) in 60% yield.

EXAMPLE 4

The procedure in Example 1 was followed with 1.8 grams of meso-inositol, 60 milliliters of pyridine and 16.3 grams of α-(p-chlorophenoxy)isobutyroyl chloride. The obtained viscous oil was purified from petroleum ether to give 7.3 grams (54% yield) of meso-inositol hexakis[α-(p-chlorophenoxy)isobutyrate] melting at 80° C.

EXAMPLE 5

A mixture of 2.6 grams of 1,1,1-trimethylolpropane, 17 grams of ethyl α-(p-chlorophenoxy)isobutyrate and 0.4 gram of potassium carbonate was heated at 150–170° C. on an oil bath under reduced pressure to remove the ethanol formed by the reaction. The residue was extracted with benzene, the extract was washed with water and the benzene was then distilled off. The residue was recrystallized from methanol to give 7.5 grams (54% yield) of 1,1,1-trimethylolpropane tris [α-(p-chlorophenoxy)isobutyrate] melting at 85–87° C.

EXAMPLE 6

A mixture of 22 grams of α-(p-chlorophenoxy)isobutyric acid, 3.8 grams of 1,3-propanediol, 0.5 gram of p-toluenesulfonic acid and 150 milliliters of xylene was refluxed. When the theoretically calculated amount of water had been removed, the xylene solution was washed with dilute aqueous sodium bicarbonate and then the xylene was distilled off. The residue was distilled under reduced pressure to give 11 grams (47% yield) of 1,3-propanediol bis[α-(p-chlorophenoxy)isobutyrate] boiling at 197–200° C./0.03 mm. Hg.

In analogous manner, 1,3-propanediol bis[α-(o-chlorophenoxy)isobutyrate] can also be prepared.

EXAMPLE 7

A mixture of 44 grams of α-(p-chlorophenylthio)isobutyric anhydride, 3.5 grams of 1,3-propanediol and 100 milliliters of benzene was refluxed for 10 hours. After cooling, the mixture was washed with dilute aqueous sodium bicarbonate and then the benzene was distilled off. The residue was distilled under reduced pressure to give 15 grams (68% yield) of 1,3-propanediol bis[α-(p-chlorophenylthio)isobutyrate] boiling at 211–214° C./0.025 mm. Hg and melting at 48–50° C.

EXAMPLE 8

A mixture of 12.5 grams of 1,3-propanediol, 0.5 gram of p-toluenesulfonic acid, 21.5 grams of α-(p-chlorophenoxy)isobutyric acid and 150 milliliters of toluene was refluxed in a flask provided with a water removing device. After about ten hours the amount of the distilled water reached the theoretically calculated amount. Then the reaction mixture was cooled, washed with dilute aqueous sodium bicarbonate, and then the toluene was distilled off. The residue was distilled under reduced pressure to give 12.5 grams (46% yield) of 1,3-propanediol mono [α-(p-chlorophenoxy)isobutyrate] boiling at 160–163° C./0.3 mm. Hg.

Elementary analysis.—Calculated for $C_{13}H_{17}O_4Cl$: C, 57.25%; H, 6.28%; Cl, 13.00%. Found: C, 57.37%; H, 6.25%; Cl, 12.91%.

Similarly prepared was: 2-methyl-2-propyl-1,3-propanediol mono[α - (p - chlorophenylthio)isobutyrate] boiling at 185–190° C./0.3 mm. Hg in 96% yield.

Elementary analysis.—Calculated for $C_{17}H_{25}O_3SCl$: C, 59.20%; H, 7.31%; Cl, 10.28%. Found: C, 58.95%; H, 7.15%; Cl, 10.13%.

EXAMPLE 9

To a solution of 4.4 grams of N,N'-bis(2-hydroxyethyl)piperazine in 50 milliliters of pyridine was added dropwise at 0–10° C. 12 grams of α-(m-tolyloxy)-isobutyroyl chloride. The mixture was allowed to stand at room temperature for 2 hours and then heated at 60–70° C. for 2 hours. Then the mixture was poured into ice water. The aqueous layer was made alkaline with potassium carbonate and extracted with benzene. The extract was dried and concentrated. To the oily residue was added alcoholic hydrochloric acid to precipitate 10 grams (67% yield) of crystalline N,N'-bis(2-hydroxyethyl) piperazine bis[α-(m-tolyloxy)-isobutyrate] dihydrochloride melting at 227–230° C.

Similarly prepared were: N,N-bis(2-hydroxyethyl) methylamine bis [α-(p-chlorophenoxy)isobutyrate] hydrochloride melting at 115–117° C. in 62% yield;

N,N - bis(3 - hydroxypropyl)methylamine bis[α - (p-chlorophenylthio)isobutyrate] hydrochloride melting at 108–110° C. in 64% yield; and N,N' - bis(2 - hydroxyethyl)piperazine bis [α - (p - methoxyphenoxy)-α-methyl-butyrate] dihydrochloride melting at 203–205° C. in 70% yield.

EXAMPLE 10

To a solution of 20 grams of 2-(2-hydroxyethoxy) ethanol and 30 grams of α-(p-tolyloxy)isobutyric acid in 100 milliliters of toluene in a flask provided with a water removing device was added 0.5 gram of p-toluenesulfonic acid. The mixture was refluxed for about 2 hours. When the calculated amount of water had been removed, the mixture was cooled, washed with aqueous sodium bicarbonate, dried and distilled under reduced pressure to give 23 grams (49% yield) of 2-(2-hydroxyethoxy)ethanol mono[α-(p-tolyloxy)isobutyrate] boiling at 145–150° C./0.02 mm. Hg.

Elementary analysis.—Calculated for $C_{15}H_{22}O_5$: C, 63.81%; H, 7.85%. Found: C, 63.55%; H, 7.81%.

EXAMPLE 11

To a solution of 2.3 grams of 2-(2-hydroxyethoxy)ethanol and 10 grams of α-(p-nitrophenoxy)isobutyric acid in 25 milliliters of pyridine was added portionwise at 20–40° C., 9.5 grams of p-toluenesulfonyl chloride. Then the mixture was heated at 40° C. for 2 hours and then refluxed on a water bath for 4 hours. The mixture was poured into water and extracted with benzene. The extract was dried, then the benzene was distilled off and ethanol was added to the residue. The mixture was allowed to stand to crystallize 7 grams (67% yield) of 2-(2-hydroxyethoxy)ethanol bis[α-(p-nitrophenoxy)isobutyrate] melting at 63–66° C.

Similarly prepared were: 2-(2-hydroxyethylthio)ethanol bis[α-(p-tolylsulfonyl)-isobutyrate] melting at 105–108° C. in 62% yield;

2-(2-hydroxyethylsulfonyl)ethanol bis[α-(2,4-dichlorophenoxy)isobutyrate], the refractive index at 21° C. being 1.5410, in 46% yield;

N,N-bis(2-hydroxyethyl)aniline bis[α-(p-chlorophenoxy)-isobutyrate], the refractive index at 25° C. being 1.5588, in 53% yield; and N,N-bis(2-hydroxyethyl)cyclohexylamine bis[α-(p-chlorophenoxy)isobutyrate], the refractive index at 21° C. being 1.5311, in 57% yield.

EXAMPLE 12

The procedure in Example 11 was followed with 4.3 grams of N,N'-bis(2-hyroxyethyl)piperazine, 10 grams of α-(p-chlorophenoxy)propionic acid, 20 milliliters of pyridine and 9.5 grams of p-toluenesulfonyl chloride. The product was treated with alcoholic hydrochloric acid to give 8 grams (53% yield) of N,N'-bis(2-hydroxyethyl)piperazine bis [α-(p-chlorophenoxyl)propionate] dihydrochloride melting at 165–170° C.

Similarly prepared were: N,N'-(2-hydroxyethyl)piperazine bis [α-(p-acetylphenoxy)isobutyrate] dihydrochloride melting at 93–95° C. in 63% yield; and N,N'-bis(2-hydroxyethyl)piperazine bis(1-phenoxycyclohexanecarboxylate) dihydrochloride metling at 225–230° C. in 50% yield.

EXAMPLE 13

A mixture of 3.8 grams of 2-[2-(2-hydroxyethoxy)-ethoxy]ethanol, 11 grams of ethyl α-(p-toluidine)-isobutyrate and 0.3 gram of potassium carbonate was heated in nitrogen atmosphere under reduced pressure at 140–160° C. for 2 hours. Then the mixture was cooled and benzene added thereto. The mixture was washed with water and then the benzene distilled off. The oily residue was crystallized from hexane to give 7 grams (57% yield) of 2-[2-(2-hydroxyethoxy)ethoxy]ethanol bis[α-(p-toluidino)-isobutyrate] melting at 74–75° C.

EXAMPLE 14

In 50 milliliters of benzene were dissolved 2.5 grams of 2-(2-hydroxyethoxy)ethanol and 21 grams of α-(p-chlorophenoxy)-isobutyric anhydride. After refluxing the mixture for 8 hours, the reaction mixture was washed with aqueous sodium bicarbonate and then the benzene distilled off. The oily residue was distilled under reduced pressure to give 6.3 grams (54% yield) of 2-(2-hydroxyethoxy)ethanol bis[α-(p-chlorophenoxy)isobutyate] boiling at 215–225° C/0.5 mm. Hg.

What is claimed is:

1. A compound of the formula

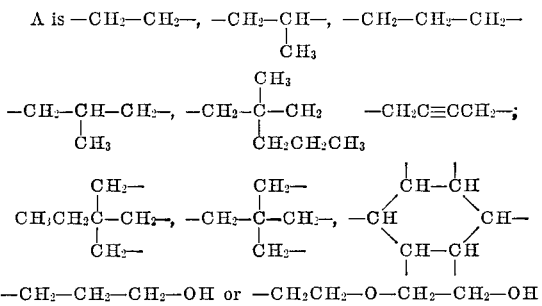

where
R¹ is methyl,
R² is mehtyl or ethyl,
R³ is H, Cl, methyl or methoxy,

A is —CH₂—CH₂—, —CH₂—CH—, —CH₂—CH₂—CH₂—
                        |
                        CH₃

```
        CH₃                                
         |                                 
—CH₂—CH—CH₂—,  —CH₂—C—CH₂   —CH₂C≡CCH₂—;
                     |
        CH₃        CH₂CH₂CH₃
```

```
         CH₂—              CH₂—                  CH—CH
          |                 |                   /     \
 CH₃CH₂C—CH₂—,   —CH₂—C—CH₂—,  —CH         CH—
          |                 |                   \     /
         CH₂—              CH₂—                  CH—CH
```

—CH₂—CH₂—CH₂—OH or —CH₂CH₂—O—CH₂—CH₂—OH and m is the valence of A.

2. A compound according to claim 1, said compound being ethyleneglycol bis[α-(p-chlorophenoxy)-isobutyrate].

3. A compound according to claim 1, said compound being 1,3-propanediol bis[α-(p-chlorophenoxy)-isobutyrate].

4. A compound according to claim 1, said compound being 1,3-propanediol mono[α-(p-chlorophenoxy)isobutyrate].

5. A compound according to claim 1, said compound being propyleneglycol bis[α-(p-chlorophenoxy)-isobutyrate].

6. A compound according to claim 1, said compound being 2-methyl-2-propyl-1,3-propanediol bis[α-(p-chlorophenoxy)-isobutyrate].

References Cited

UNITED STATES PATENTS

| | | | |
|---|---|---|---|
| 2,170,996 | 8/1939 | Grether et al. | 260—473 |
| 3,262,850 | 7/1966 | Jones et al. | 260—473 X |
| 2,818,424 | 12/1957 | Zeile et al. | 260—473 |
| 3,005,828 | 10/1961 | Baldridge | 260—473 X |

LORRAINE A. WEINBERGER, Primary Examiner

D. STENZEL, Assistant Examiner

U.S. Cl. X.R.

260—268, 347.5, 470, 471, 472; 424—307, 308